United States Patent
Queen et al.

(10) Patent No.: US 12,209,810 B2
(45) Date of Patent: Jan. 28, 2025

(54) SYSTEMS AND METHODS FOR MANAGING THERMAL ENERGY

(71) Applicant: PHASESTOR LLC, Charlotte, NC (US)

(72) Inventors: A. Scott Queen, Greensboro, NC (US); Reyad I. Sawafta, Greensboro, NC (US); Rami M. Saeed, Greensboro, NC (US); Domenico Feo, Greensboro, NC (US); Byron Owens, Greensboro, NC (US)

(73) Assignee: PHASESTOR LLC, Charlotte, NC (US)

( * ) Notice: Subject to any disclaimer, the term of this patent is extended or adjusted under 35 U.S.C. 154(b) by 0 days.

(21) Appl. No.: 17/768,077

(22) PCT Filed: Oct. 10, 2020

(86) PCT No.: PCT/US2020/055164
§ 371 (c)(1),
(2) Date: Apr. 11, 2022

(87) PCT Pub. No.: WO2021/072335
PCT Pub. Date: Apr. 15, 2021

(65) Prior Publication Data
US 2024/0093949 A1      Mar. 21, 2024

Related U.S. Application Data

(60) Provisional application No. 62/914,125, filed on Oct. 11, 2019.

(51) Int. Cl.
*F28D 20/02*       (2006.01)
*F28F 3/14*        (2006.01)

(52) U.S. Cl.
CPC .............. *F28D 20/021* (2013.01); *F28F 3/14* (2013.01); *F28F 2210/02* (2013.01); *F28F 2255/00* (2013.01)

(58) Field of Classification Search
CPC ....... F28D 20/021; F28F 3/14; F28F 2210/02; F28F 2255/00; F24F 5/0021; F24F 2005/0032; B65D 81/3823; B65D 81/18
See application file for complete search history.

(56) References Cited

U.S. PATENT DOCUMENTS

| | | | |
|---|---|---|---|
| 10,401,876 B1* | 9/2019 | Coleman | ................... G05D 7/00 |
| 2008/0057776 A1* | 3/2008 | Cummings | .......... H01R 13/005 |
| | | | 285/119 |

(Continued)

FOREIGN PATENT DOCUMENTS

| | | |
|---|---|---|
| DE | 102007048416 A1 | 4/2009 |
| EP | 2848885 A1 | 3/2015 |
| WO | 2019129649 A1 | 7/2019 |

OTHER PUBLICATIONS

International Search Report and Written Opinion issued in counterpart PCT Application No. PCT/US2020/055164 dated Mar. 23, 2021 (eight (8) pages).

*Primary Examiner* — Len Tran
*Assistant Examiner* — Kamran Tavakoldavani
(74) *Attorney, Agent, or Firm* — TILLMAN WRIGHT, PLLC; Chad D. Tillman

(57) ABSTRACT

In one aspect, thermal energy storage systems are described herein. In some embodiments, such a system comprises a container, a heat exchanger disposed within the container, and a phase change material (PCM) disposed within the container. The heat exchanger comprises an inlet pipe, an outlet pipe; and a number n of plates in fluid communication with the inlet pipe and the outlet pipe, wherein n is at least 2. The inlet pipe, outlet pipe, and plates are arranged and (Continued)

connected such that a fluid flowing from the inlet pipe and to the outlet pipe flows through the plates in between the inlet pipe and the outlet pipe. The PCM disposed within the container is also in thermal contact with the plates.

10 Claims, 5 Drawing Sheets

(56) References Cited

U.S. PATENT DOCUMENTS

| | | | |
|---|---|---|---|
| 2014/0251310 A1 | 9/2014 | Muren et al. | |
| 2019/0128478 A1* | 5/2019 | Banerjee | E04B 1/34336 |
| 2019/0248573 A1* | 8/2019 | Collison | B65D 81/3823 |
| 2019/0383276 A1* | 12/2019 | Rilby | F28D 20/028 |
| 2022/0336900 A1* | 10/2022 | Merino | H01M 50/22 |
| 2023/0194188 A1* | 6/2023 | De Jesus Teixeira | F28D 20/021 165/10 |

* cited by examiner

SYSTEMS AND METHODS FOR MANAGING THERMAL ENERGY

CROSS REFERENCE TO RELATED APPLICATIONS

This application is a 35 U.S.C. § 371 U.S. national phase entry of International Application No. PCT/US2020/055164 having an international filing date of Oct. 20, 2020, which claims priority pursuant to 35 U.S.C. § 119 to U.S. Provisional Patent Application Ser. No. 62/914,125, filed on Oct. 11, 2019, which are hereby incorporated by reference in their entirety entireties.

FIELD

The present disclosure relates to thermal energy storage and management systems including a phase change material (PCM) or latent heat storage material, and to methods of storing and releasing thermal energy using such systems.

BACKGROUND

The production of electricity is generally more expensive during peak demand hours than at low demand hours. Therefore, various thermal energy storage systems have been developed which permit the storage of thermal energy for later use, such as during peak demand hours. Such deferred use of stored energy can reduce strain on the power grid and/or reduce the average cost of energy per kilowatt-hour during peak load periods. However, some previous thermal energy storage systems suffer from one or more disadvantages, such as short thermal energy storage periods, low efficiency, low versatility, and difficulty of installation. Improved thermal energy storage systems are therefore desired.

SUMMARY

In one aspect, thermal energy storage and management systems are described herein. Such systems, in some cases, can provide one or more advantages compared to some existing systems. In some embodiments, for example, a system described herein can provide more versatile thermal energy storage and release than some existing systems. A system described herein, in some cases, can also be used in a modular manner. Additionally, a system described herein, in some instances, is easier to install, use, and maintain, as compared to some other systems. Moreover, systems described herein can be used for a variety of end-uses or applications, including but not limited to thermal energy storage, release, and management for industrial, commercial, and/or residential buildings, such as may be desired for so-called load shifting of energy use of a heating, ventilating, and air conditioning (HVAC) system of a building, or for load shifting of other energy used by the building. In this manner, as described above, the cost of energy obtained from a power grid or from an alternative source of energy (such as a solar panel) can be reduced. Systems described herein may also be used for the management and/or "recycling" of waste heat, or for the management of undesired or potentially hazardous thermal energy. For example, in some cases, a system described herein can be used to maintain or otherwise manage the temperature of a nuclear reactor cooling pool (such as for fuel rods), including during a general power outage or other loss of power. A system described herein may also be used to capture, store, and subsequently discharge on demand the thermal energy of a source of "waste heat," such as steam. Thermal energy storage and management systems described herein may be used advantageously for other purposes also, as described further herein.

In some embodiments, a thermal energy storage system described herein comprises a container, a heat exchanger disposed within the container, and a phase change material (PCM) disposed within the container. The heat exchanger comprises an inlet pipe (or inlet "header"), an outlet pipe (or outlet "header"), and a number n of plates in fluid communication with the inlet pipe and the outlet pipe, wherein n is at least 2, such that a plurality of plates is used. The inlet pipe, outlet pipe, and plates are arranged and connected such that a fluid flowing from the inlet pipe and to the outlet pipe flows through the plates (or at least a portion of the plates or some of the plates) in between the inlet pipe and the outlet pipe. For instance, in such an arrangement, a fluid flowing into the inlet pipe and out of the outlet pipe flows through at least a portion of the plates after flowing into the inlet pipe but before flowing out of the outlet pipe. Moreover, in thermal energy storage systems described herein, the PCM disposed within the container is also in thermal contact with the plates of the heat exchanger. Additionally, it is to be understood that fluid generally enters the heat exchanger through an end of the inlet pipe denoted herein as the "proximal" end. Moreover, as described further herein, fluid generally exits the heat exchanger through a "distal" end of the outlet pipe or (in some cases) through a distal end of the inlet pipe. Additional features of various components of thermal energy storage systems are described further in the detailed description which follows.

As described further herein, it is also to be understood that various exterior systems can be connected to a thermal energy storage system of the present disclosure, such that fluid communication is provided between the plates of the thermal energy storage system and the exterior system. For instance, in some cases, an HVAC chiller or source of waste heat (external to the thermal energy storage system itself) is attached to or associated with the thermal energy storage system.

In another aspect, methods of storing and releasing thermal energy are described herein. In some cases, such a method comprises attaching a thermal energy storage or management system described herein to an external source of an external fluid. In some implementations, the external fluid is liquid water. Additionally, the external source of the external fluid can comprise an HVAC chiller or a source of waste heat. Moreover, methods described herein, in some instances, further comprise forcing a first portion of the external fluid through the heat exchanger of the thermal energy system. That is, the external fluid enters the heat exchanger of the system through a proximal end and exits the heat exchanger through a distal end, having passed through the plates of the heat exchanger. Further, in some embodiments, the first portion of the external fluid enters the heat exchanger at a first or initial temperature (T1) and exits the heat exchanger at a second or exit temperature (T2), where T1 and T2 are different. For example, T1 can be higher or lower than T2. In addition, the first portion of the external fluid can participate in thermal energy transfer or heat exchange with the PCM disposed in the container of the relevant thermal energy storage and/or management system. In some embodiments, for example, the first portion of the external fluid transfers thermal energy or heat to the PCM, thereby lowering the temperature of the first portion of the external fluid. The PCM, in turn, can store at least a portion of the transferred thermal energy as latent heat (e.g., by using the received thermal energy to undergo a phase transition, such as a transition from a solid state to a liquid state). A method described herein, in some implementations, further comprises forcing a second portion of the external fluid through the heat exchanger of the thermal energy system and transferring at least a portion of the stored latent heat from the PCM to the second portion of the external fluid, thereby increasing the temperature of the second portion of the external fluid. Such subsequent "discharging" of the PCM can occur at a subsequent time period, which may be hours or even days later.

In this manner, as described further herein, a thermal energy storage system can store thermal energy during a first time interval and release it during a second time interval. For example, the system can store thermal energy when the PCM of the system is exposed to a relatively warm external fluid, where the relative warmth of the external fluid is based on the external fluid having a temperature that is greater than the relevant phase transition temperature of the PCM and greater than the temperature of the PCM. The system can release the stored thermal energy when the PCM of the system is later exposed to a relatively cool external fluid. It is also possible for the storing-and-releasing cycle described above to be carried out in the opposite sequence—releasing of thermal energy (i.e., heating of the external fluid) followed by storing of thermal energy (i.e., cooling of the external fluid).

These and other implementations are described in more detail in the detailed description which follows.

DETAILED DESCRIPTION

Figure 1:
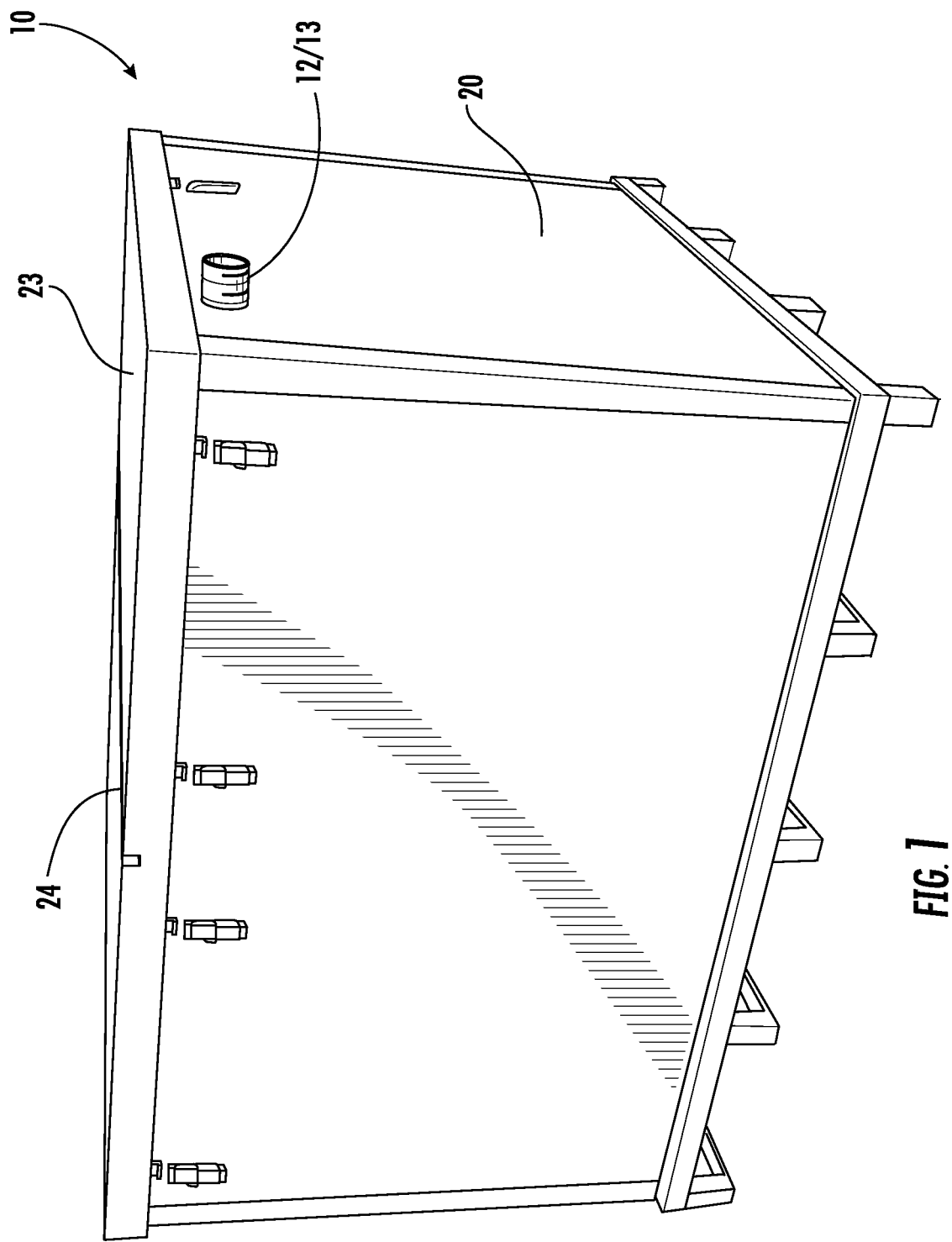
FIG. 1 illustrates a perspective view of a thermal energy storage system according to one embodiment described herein.

Implementations and embodiments described herein can be understood more readily by reference to the following detailed description, examples, and drawings. Elements, apparatus, and methods described herein, however, are not limited to the specific implementations presented in the detailed description, examples, and drawings. It should be recognized that these implementations are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum of 1.0 or more and ending with a maximum value of 10.0 or less, e.g., 1.0 to 5.3, or 4.7 to 10.0, or 3.6 to 7.9. Similarly, as will be clearly understood, a stated range of "1 to 10" should be considered to include any and all subranges beginning with a minimum of 1 or more and ending with a maximum value of 10 or less, e.g., 1 to 6, or 7 to 10, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points of 5 and 10.

I. THERMAL ENERGY STORAGE AND MANAGEMENT SYSTEMS

In one aspect, thermal energy storage and/or management systems are described herein. In some embodiments, a thermal energy storage system described herein comprises a container, a heat exchanger disposed within the container, and a PCM disposed within the container, wherein the heat exchanger comprises an inlet pipe or header, an outlet pipe or header, and a number n of thermal transfer or heat exchange plates in fluid communication with the inlet pipe and the outlet pipe such that a fluid flowing from the inlet pipe and to the outlet pipe flows through the plates in between the inlet pipe and the outlet pipe, wherein the PCM is in thermal contact with the plates, and wherein the number n is at least 2. In some cases, the number n is at least 5, at least 10, at least 20, or at least 50. In some instance, the number n is between 2 and 500, between 2 and 250, between 2 and 100, between 5 and 500, between 5 and 100, between 10 and 200, between 10 and 100, between 10 and 40, between 20 and 200, or between 20 and 100. However, the number of plates is not particularly limited and can be chosen based on the overall dimensions of the container, the spacing between plates, the amount of PCM, and/or the desired latent heat capacity of the system. Moreover, as described above, it is to be understood that fluid generally enters the heat exchanger apparatus through a "proximal" end of the inlet pipe and generally exits the heat exchange apparatus through a "distal" end of the outlet pipe or (in some cases) through a distal end of the inlet pipe. Additionally, in some instances, a fluid flowing into the inlet pipe and out of the outlet pipe flows through at least a portion of the plates or through some of the plates after flowing into the inlet pipe but before flowing out of the outlet pipe. Further details regarding the configuration, operation, and use of systems described herein is provided below, including with reference to the drawings and specific examples and implementations.

Figure 2:
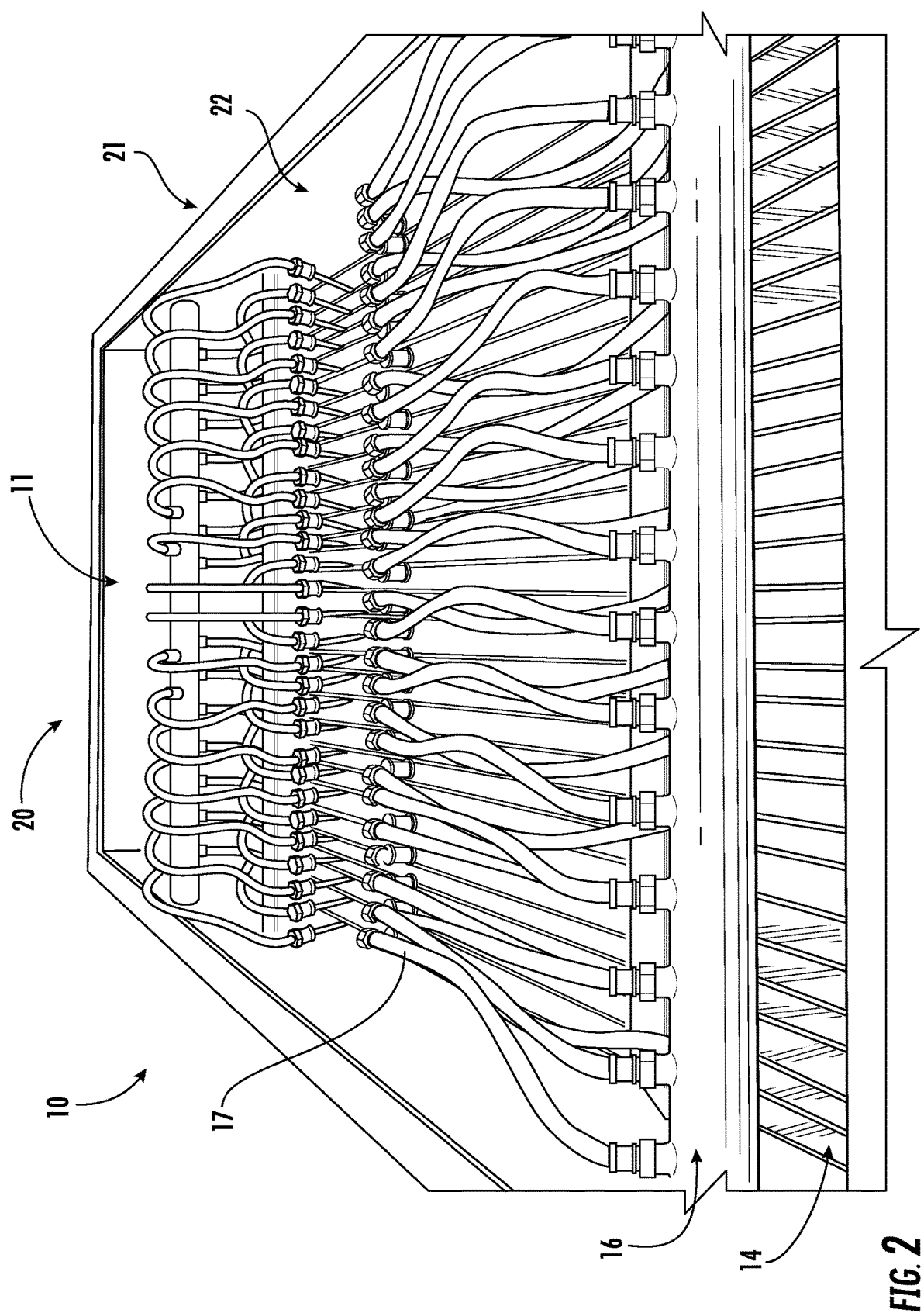
FIG. 2 illustrates a top perspective view of a portion of the heat exchanger of the thermal energy storage system of FIG. 1 (with the cover of the system removed).
Figure 3:
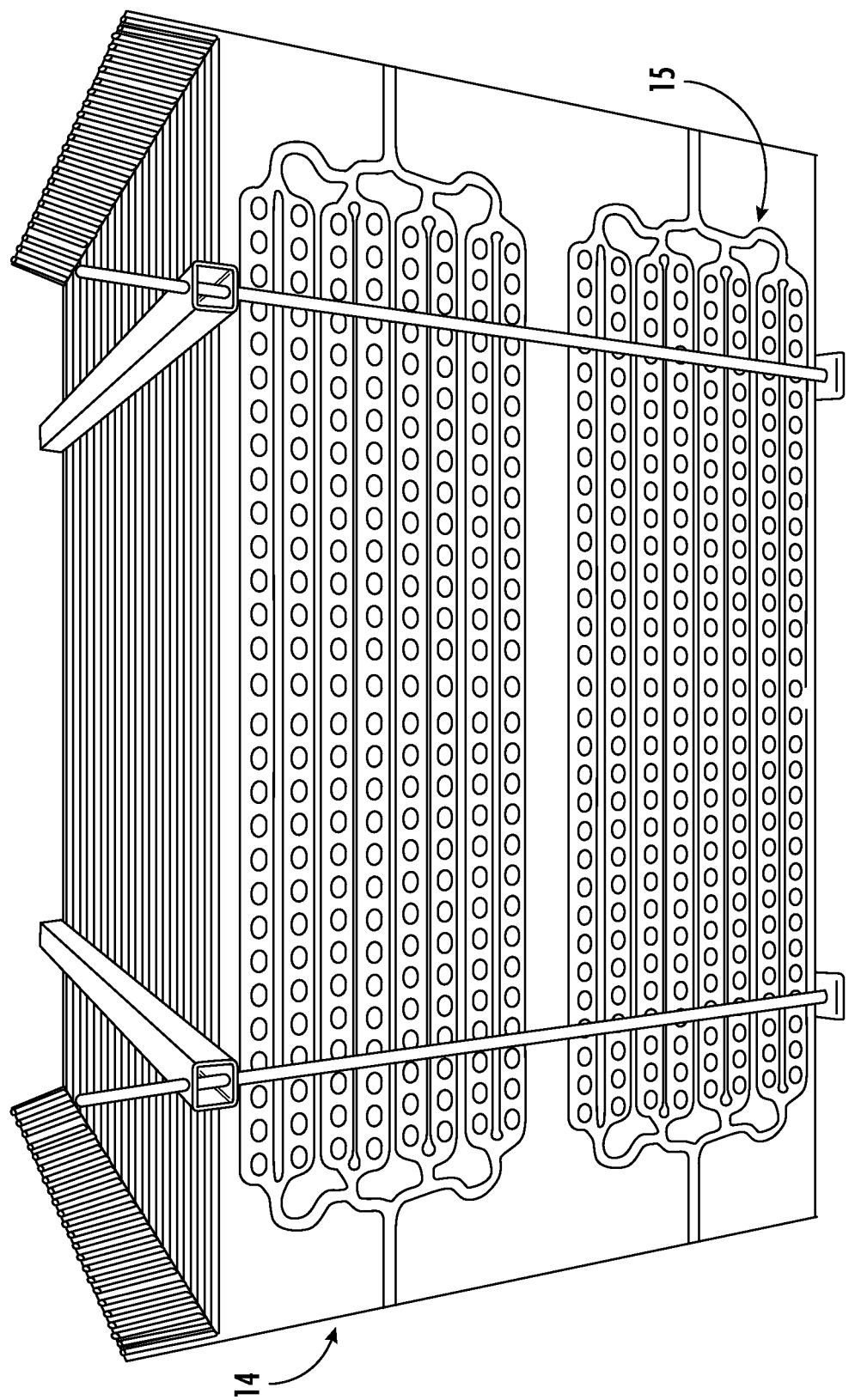
FIG. 3 illustrates a perspective view of a plurality of heat exchange plates joined by spacers, in accordance with one embodiment of a thermal energy storage system described herein.
Figure 4:
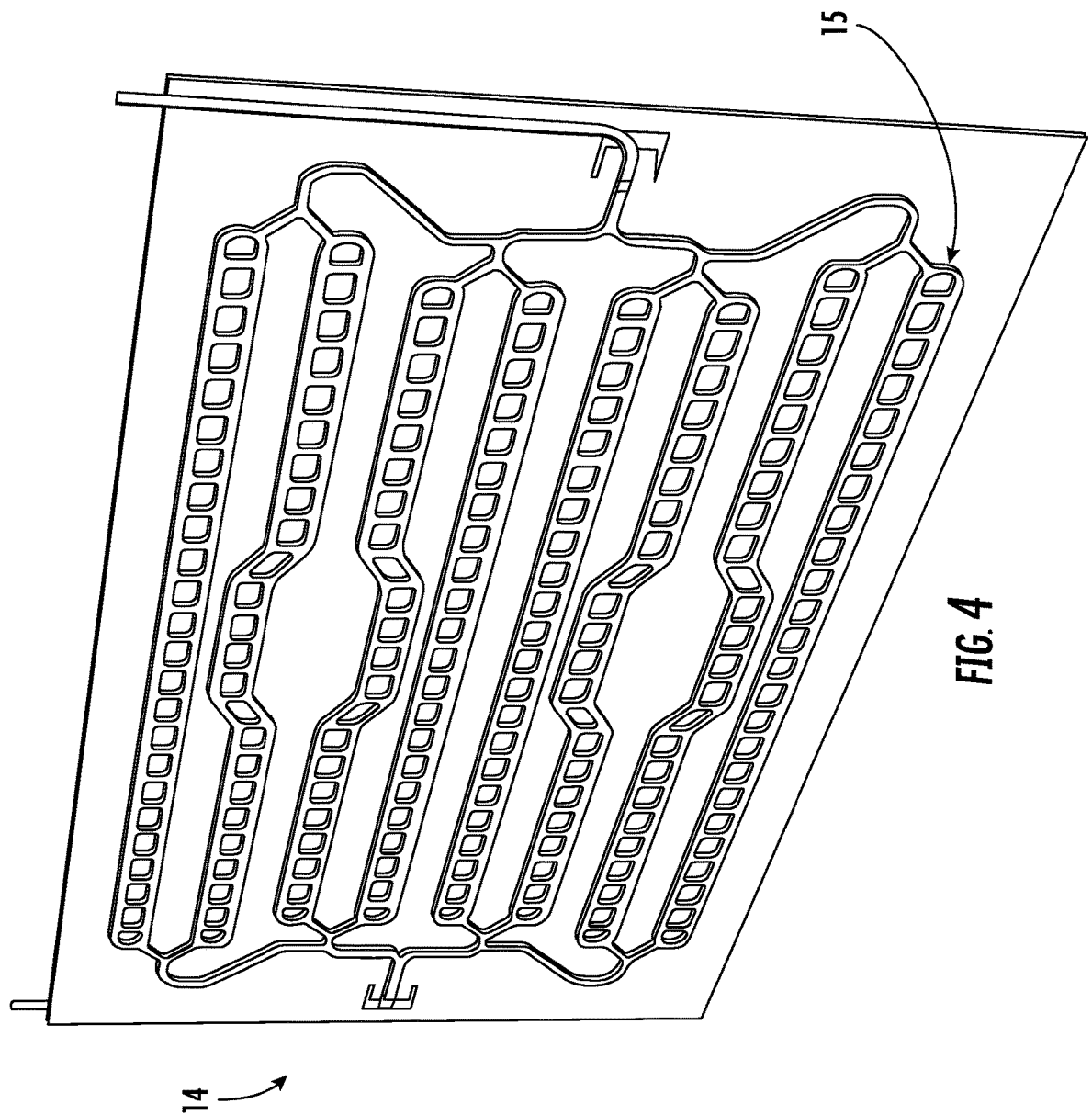
FIG. 4 illustrates a perspective view of a single heat exchange plate according to one embodiment described herein.

FIGS. 1-5 illustrate one or more non-limiting, exemplary implementations and embodiments of thermal energy storage systems and/or thermal energy management systems described herein. While it is to be understood that the components or features depicted in the aforementioned figures are merely representative of one implementation of these components or features, the reference numerals used in these figures correspond with the following nomenclature for such components or features in the implementations shown in the figures:

10 thermal energy storage system
11 heat exchanger
12 inlet pipe
13 outlet pipe
14 plates 15 inflated channel
16 header pipe
17 flexible conduits or hoses
20 container
21 exterior walls
22 interior walls
23 cover
24 rain channel
30 thermal energy management system
31 connector
40 first thermal energy storage system
41 first container
42 first inlet pipe
50 second thermal energy storage system
51 second container
52 second inlet pipe Briefly, with reference to the drawings, FIG. 1 illustrates a perspective view of one non-limiting, exemplary embodiment of a thermal energy storage system described herein. As illustrated in FIG. 1 and FIG. 2, a thermal energy storage system comprises a container, a heat exchanger disposed within the container, and a PCM (not shown) disposed within the container. The container is defined by a floor, side walls, and a cover.

It should further be noted that the PCM is not explicitly shown for clarity. However, in the embodiment of FIG. 2, the PCM would occupy a portion of the interior volume of the container that is not occupied by the heat exchanger. More specifically, the heat exchanger can be considered to be "immersed" or "embedded" in a "pool" or "block" of the PCM. The "pool" or "block" of PCM, in some cases, could "rise" or extend from the floor of the container to a level within the interior volume corresponding to line "L1" illustrated on the container, or corresponding to line "L2" illustrated on the heat exchanger, or corresponding to some other "fill level," where the "fill level" may be selected based on a desired degree of "immersion" of the plates of the heat exchanger, based on a desired thermal mass or latent heat capacity of the PCM, and/or based on ease of installation or maintenance of the system. It is to be understood that the PCM is in thermal contact with the plates, such as may be especially provided by direct physical contact between the PCM and exterior surfaces of the plates.

As illustrated in FIG. 2, the heat exchanger comprises an inlet pipe or header, an outlet pipe or header, and a number n of plates in fluid communication with the inlet pipe and the outlet pipe. Exemplary details regarding fixtures, openings, or apertures connecting the inlet pipe and the outlet pipe to the plates are described further hereinbelow. A flowing fluid that flows from the inlet pipe to the outlet pipe flows through the plates in between the inlet pipe and the outlet pipe. The fluid can generally enter the heat exchange apparatus through a "proximal" end of the inlet pipe and generally exit the heat exchange apparatus through a "distal" end of the outlet pipe. It should further be noted that the assignment of a specific pipe or header as the "inlet" or "outlet" pipe is not necessarily fixed, but instead can be based on the direction of flow of a fluid in a specific instance.

Specific components of thermal energy storage systems described herein will now be described in more detail. Systems described herein comprise a container. Any container not inconsistent with the objectives of the present disclosure may be used. Moreover, the container can have any size, shape, and dimensions and be formed from any material or combination of materials not inconsistent with the objectives of the present disclosure. In some embodiments, for example, the container is made from one or more weather-resistant materials, thereby permitting installation of the system in an outdoor environment. In some cases, the container is metal or formed from a metal or a mixture or alloy of metals, such as aluminum. In other instances, the container is formed from plastic or a composite material, such as a composite fiber or fiberglass material.

Additionally, in some instances, the container of a system described herein provides functionality beyond containment of the PCM and heat exchanger. For example, in some cases, a container comprises exterior walls, interior walls, and a thermally insulating material disposed in between the exterior walls and the interior walls. Any thermally insulating material not inconsistent with the objectives of the present disclosure may be used. In some embodiments, the thermally insulating material is air or a vacuum. In other cases, the thermally insulating material comprises a foam, such as a polyisocyanurate foam. Further, in some instances, the exterior walls and/or the interior walls of the container are formed from a metal, plastic, composite material, or a combination of two or more of the foregoing. It is further to be understood that such exterior and interior walls (as well as anything disposed between them, such as a thermally insulating material) can together form each "side wall" and "floor" of the container. Similarly, in some instances, a cover of a container described herein likewise comprises exterior walls, interior walls, and a thermally insulating material disposed in between the exterior walls and interior walls. Further, in some implementations, the "cover" is formed from such a "multi-layered" or composite cover, though the individual layers (e.g., the thermally insulating material disposed within the cover) are not expressly shown in the figures.

Moreover, in some embodiments described herein, the floor, side walls, and/or cover of the container have an R-value of at least 4 square-foot*degree Fahrenheit*hour per British thermal unit per inch ($ft^{2}*°$ F.*h/BTU*inch). In some cases, the floor, side walls, and/or cover of the container have an R-value of at least 5, at least 6, or at least 8 ($ft^{2}*°$ F.*h/BTU*inch). In some instances, the R-value of the floor, side walls, and/or cover is between 4 and 10, between 4 and 8, between 4 and 6, between 5 and 10, between 5 and 8, or between 6 and 10 ($ft^{2}*°$ F.*h/BTU*inch).

Additionally, in some cases, a gasket, seal, or sealing layer is disposed between the cover and the side walls of a container described herein, or is disposed within or forms part of the cover. Such a gasket may be part of the main body of the container, or part of the cover of the container. Further, such a gasket can provide further thermal insulation and/or protection of the interior volume of the container from external factors such as water or other materials that may be present in the exterior environment of the container/system, particularly when the container/system is disposed or installed outdoors. The container of a system described herein may also include or comprise lugs or other features on one or more exterior surfaces of the container, such as one or more detachable lifting lugs disposed on one or more exterior surfaces of the container.

Moreover, in some preferred embodiments, it is particularly to be noted that the container is not a standard shipping container. For example, in some embodiments, the container is not a container specifically approved by the Department of Transportation for shipping, such as a container having exterior dimensions of 20 feet by 8 feet by 8 feet. A container for use in a thermal energy storage system described herein, in some embodiments, can have other dimensions. The size and shape of the container, in some embodiments, are selected based on one or more of a desired thermal energy storage capacity of the system, a desired footprint of the system, and a desired stackability or portability of the system. For example, although the container is not itself a standard shipping container, it is to be understood that a container of a thermal energy management system described herein can be fitted or placed inside of a standard shipping container, such as for ease of shipment or transport of the system. In some preferred embodiments, the container of a thermal energy management system described herein has overall length, width, and height dimensions that permit two containers of two separate systems to be stacked on top of another (two high) and then placed within a standard shipping container. Further, in some cases, the overall dimensions of each container of each separate system are selected to permit an integral number (e.g., 4, 5, or 6) of "two-high" stacks to be placed or fitted within the interior of a standard shipping container. However, the exterior dimensions of the container of a thermal energy storage system described herein are not particularly limited, and other dimensions may also be used.

Turning now to the relationship between the container of a system described herein and the heat exchanger disposed within the container, it is to be understood that the heat exchanger or heat exchange apparatus can be disposed, installed, or fitted within the container (e.g., within or primarily within the interior volume of the container) in any manner not inconsistent with the objectives of the present disclosure. For example, in some cases, the entire volume or almost the entire volume of the heat exchanger is disposed within the interior space of the container, and only a small portion or only one or more connector portions of the heat exchanger are disposed or configured outside the container for purposes of providing access to the plates or other majority portion of the heat exchanger inside the container. In some embodiments, for instance, the inlet pipe of the heat exchanger (or a connector portion thereof) passes through (or partially through) an exterior wall of the container, thereby providing fluid communication between the plates and an exterior of the container. Similarly, in some cases, the outlet pipe (or a connector portion thereof) of the heat exchanger passes through (or partially through) an exterior wall of the container, thereby providing fluid communication between the plates and an exterior of the container.

As described further herein, it is to be understood that various exterior systems can be connected to the thermal energy management system, such that fluid communication is provided between the plates of the thermal energy management system and the exterior systems. For instance, in some cases, an HVAC chiller or source of waste heat (external to the thermal energy management system itself) is attached to or associated with the thermal energy management system.

Turning once again to certain embodiments, in some cases, the n plates of a thermal energy storage system described herein are in fluid communication with the inlet pipe and the outlet pipe in parallel with one another. It is to be understood that heat exchange or thermal transfer plates that are arranged "in parallel" are each independently connected to the inlet and outlet pipes (or to a header pipe or portion of pipe disposed between the inlet and outlet pipes), such that a specific portion or "plug" of fluid flowing from the inlet pipe, through a given plate, and then into the outlet pipe flows through only that given plate (as opposed to flowing through more than one plate). This "in parallel" configuration differs from a "serial" or "in series" arrangement in which a specific portion of fluid flowing from the inlet pipe to the outlet pipe flows through a plurality of plates in between the inlet pipe and the outlet pipe.

Additionally, in some cases, the plates (or each plate, or one or more of the plates) of a thermal energy storage system described herein have or are defined by two heat transfer surfaces in facing opposition to one another, the two heat transfer surfaces being joined to one another to form four edges. Further, the edges can be relatively thin compared to the heat transfer surfaces. For instance, in some cases, the average length and the average width of the two heat transfer surfaces are at least 50 times, at least 100 times, at least 200 times, or at least 500 times the average thickness of the four edges. In some cases, the average length and the average width of the two heat transfer surfaces are 50-1000, 50-500, 100-1000, or 100-500 times the average thickness of the four edges.

In addition, in preferred embodiments of a thermal energy storage system described herein, the plates of the heat exchanger are substantially parallel to one another (here, "parallel" refers to spatial alignment, as opposed to the use of "in parallel" hereinabove, which referred to flow path). As described above, it is to be understood that two or more plates that are "substantially" parallel to one another are offset or off-axis by less than about 10 degrees, less than about 5 degrees, less than about 3 degrees, or less than about 1 degree. Such parallel plates are readily observed in FIGS. 2 and 3, for instance. Moreover, in some cases, the plates are spaced apart from one another by an average distance (d) defined by one of Equations (1)-(3):

$$d=0.28k+1.33, \text{ for } 0.01<k<0.40 \text{ W/m·K}, \quad \text{Equation (1)};$$

$$d=0.23k+1.34, \text{ for } 0.41<k<1.00 \text{ W/m·K} \quad \text{Equation (2); and}$$

$$d=0.12k+1.44, \text{ for } k>1.01 \text{ W/m·K} \quad \text{Equation (3)},$$

where d is the average plate-to-plate distance in inches and k is the thermal conductivity of the phase change material in contact with the plates. It is further to be understood that the plates of a heat exchanger described herein can be formed from any material not inconsistent with the objectives of the present disclosure. In some cases, for instance, the plates are formed from aluminum or from another metal.

Turning now to the phase change material of a thermal energy storage system described herein, the PCM, in some preferred embodiments, is in direct physical contact with heat exchange surfaces of the plates. For example, in some cases, as described above, the heat exchanger is at least partially embedded in the phase change material.

Any PCM not inconsistent with the objectives of the present disclosure may be used in a thermal energy storage system described herein. Moreover, the PCM (or combination of PCMs) used in a particular instance can be selected based on a relevant operational temperature range for the specific end use or application. For example, in some cases, the PCM has a phase transition temperature within a range suitable for heating or cooling a residential or commercial building. In other instance, the PCM has a phase transition temperature suitable for the thermal energy management of so-called waste heat. In some embodiments, the PCM has a phase transition temperature within one of the ranges of Table 1 below.

TABLE 1

Phase transition temperature ranges for PCMs.
Phase Transition Temperature Ranges 450-550° C.
300-550° C.
70-100° C.
60-80° C.
40-50° C.
16-23° C.

TABLE 1-continued

Phase transition temperature ranges for PCMs.
Phase Transition Temperature Ranges 16-18° C.
15-20° C.
6-8° C.
−40 to −10° C.

As described further herein, a particular range can be selected based on the desired application. For example, PCMs having a phase transition temperature of 15-20° C. can be especially desirable to assist in the cooling of nuclear reactor fuel rod cooling pools, while PCMs having a phase transition temperature of 6-8° C. can be especially desirable for HVAC energy storage support. As another non-limiting example, PCMs having a phase transition between −40° C. and −10° C. can be preferred for use in space applications or for support of commercial freezer cooling.

Further, a PCM of a thermal energy storage system described herein can either absorb or release energy using any phase transition not inconsistent with the objectives of the present disclosure. For example, the phase transition of a PCM described herein, in some embodiments, comprises a transition between a solid phase and a liquid phase of the PCM, or between a solid phase and a mesophase of the PCM. A mesophase, in some cases, is a gel phase. Thus, in some instances, a PCM undergoes a solid-to-gel transition.

Moreover, in some cases, a PCM or mixture of PCMs has a phase transition enthalpy of at least about 50 kJ/kg or at least about 100 kJ/kg. In other embodiments, a PCM or mixture of PCMs has a phase transition enthalpy of at least about 150 kJ/kg, at least about 200 kJ/kg, at least about 300 kJ/kg, or at least about 350 kJ/kg. In some instances, a PCM or mixture of PCMs has a phase transition enthalpy between about 50 kJ/kg and about 350 kJ/kg, between about 100 kJ/kg and about 350 kJ/kg, between about 100 kJ/kg and about 220 kJ/kg, or between about 100 kJ/kg and about 250 kJ/kg.

In addition, a PCM of a thermal energy storage system described herein can have any composition not inconsistent with the objectives of the present disclosure. In some embodiments, for instance, a PCM comprises an inorganic composition. In other cases, a PCM comprises an organic composition. In some instances, a PCM comprises a salt hydrate. Suitable salt hydrates include, without limitation, $CaCl_2 \cdot 6H_2O$, $Ca(NO_3)_2 \cdot 3H_2O$, $NaSO_4 \cdot 10H_2O$, $Na(NO_3)_2 \cdot 6H_2O$, $Zn(NO_3)_2 \cdot 2H_2O$, $FeCl_3 \cdot 2H_2O$, $Co(NO_3)_2 \cdot 6H_2O$, $Ni(NO_3)_2 \cdot 6H_2O$, $MnCl_2 \cdot 4H_2O$, $CH_3COONa \cdot 3H_2O$, $LiC_2H_3O_2 \cdot 2H_2O$, $MgCl_2 \cdot 4H_2O$, $NaOH \cdot H_2O$, $Cd(NO_3)_2 \cdot 4H_2O$, $Cd(NO_3)_2 \cdot 1H_2O$, $Fe(NO_3)_2 \cdot 6H_2O$, $NaAl(SO_4)_2 \cdot 12H_2O$, $FeSO_4 \cdot 7H_2O$, $Na_3PO_4 \cdot 12H_2O$, $Na_2B_4O_7 \cdot 10H_2O$, $Na_3PO_4 \cdot 12H_2O$, $LiCH_3COO \cdot 2H_2O$, and/or mixtures thereof.

In other embodiments, a PCM comprises a fatty acid. A fatty acid, in some embodiments, can have a C4 to C28 aliphatic hydrocarbon tail. Further, in some embodiments, the hydrocarbon tail is saturated. Alternatively, in other embodiments, the hydrocarbon tail is unsaturated. In some embodiments, the hydrocarbon tail can be branched or linear. Non-limiting examples of fatty acids suitable for use in some embodiments described herein include caprylic acid, capric acid, lauric acid, myristic acid, palmitic acid, stearic acid, arachidic acid, behenic acid, lignoceric acid, and cerotic acid. In some embodiments, a PCM described herein comprises a combination, mixture, or plurality of differing fatty acids. For reference purposes herein, it is to be understood that a chemical species described as a "Cn" species (e.g., a "C4" species or a "C28" species) is a species of the identified type that includes exactly "n" carbon atoms. Thus, a C4 to C28 aliphatic hydrocarbon tail refers to a hydrocarbon tail that includes between 4 and 28 carbon atoms.

In some embodiments, a PCM comprises an alkyl ester of a fatty acid. Any alkyl ester not inconsistent with the objectives of the present disclosure may be used. For instance, in some embodiments, an alkyl ester comprises a methyl ester, ethyl ester, isopropyl ester, butyl ester, or hexyl ester of a fatty acid described herein. In other embodiments, an alkyl ester comprises a C2 to C6 ester alkyl backbone or a C6 to C12 ester alkyl backbone. In some embodiments, an alkyl ester comprises a C12 to C28 ester alkyl backbone. Further, in some embodiments, a PCM comprises a combination, mixture, or plurality of differing alkyl esters of fatty acids. Non-limiting examples of alkyl esters of fatty acids suitable for use in some embodiments described herein include methyl laurate, methyl myristate, methyl palmitate, methyl stearate, methyl palmitoleate, methyl oleate, methyl linoleate, methyl docosahexanoate, methyl ecosapentanoate, ethyl laurate, ethyl myristate, ethyl palmitate, ethyl stearate, ethyl palmitoleate, ethyl oleate, ethyl linoleate, ethyl docosahexanoate, ethyl ecosapentanoate, isopropyl laurate, isopropyl myristate, isopropyl palmitate, isopropyl stearate, isopropyl palmitoleate, isopropyl oleate, isopropyl linoleate, isopropyl docosahexanoate, isopropyl ecosapentanoate, butyl laurate, butyl myristate, butyl palmitate, butyl stearate, butyl palmitoleate, butyl oleate, butyl linoleate, butyl docosahexanoate, butyl ecosapentanoate, hexyl laurate, hexyl myristate, hexyl palmitate, hexyl stearate, hexyl palmitoleate, hexyl oleate, hexyl linoleate, hexyl docosahexanoate, and hexyl ecosapentanoate.

In some embodiments, a PCM comprises a fatty alcohol. Any fatty alcohol not inconsistent with the objectives of the present disclosure may be used. For instance, a fatty alcohol, in some embodiments, can have a C4 to C28 aliphatic hydrocarbon tail. Further, in some embodiments, the hydrocarbon tail is saturated. Alternatively, in other embodiments, the hydrocarbon tail is unsaturated. The hydrocarbon tail can also be branched or linear. Non-limiting examples of fatty alcohols suitable for use in some embodiments described herein include capryl alcohol, pelargonic alcohol, capric alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, arachidyl alcohol, heneicosyl alcohol, behenyl alcohol, lignoceryl alcohol, ceryl alcohol, and montanyl alcohol. In some embodiments, a PCM comprises a combination, mixture, or plurality of differing fatty alcohols.

In some embodiments, a PCM comprises a fatty carbonate ester, sulfonate, or phosphonate. Any fatty carbonate ester, sulfonate, or phosphonate not inconsistent with the objectives of the present disclosure may be used. In some embodiments, a PCM comprises a C4 to C28 alkyl carbonate ester, sulfonate, or phosphonate. In some embodiments, a PCM comprises a C4 to C28 alkenyl carbonate ester, sulfonate, or phosphonate. In some embodiments, a PCM comprises a combination, mixture, or plurality of differing fatty carbonate esters, sulfonates, or phosphonates. In addition, a fatty carbonate ester described herein can have two alkyl or alkenyl groups described herein or only one alkyl or alkenyl group described herein.

Moreover, in some embodiments, a PCM comprises a paraffin. Any paraffin not inconsistent with the objectives of the present disclosure may be used. In some embodiments, a PCM comprises n-dodecane, n-tridecane, n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane, n-nonacosane, n-triacontane, n-hentriacontane, n-dotriacontane, n-tritriacontane, and/or mixtures thereof.

In addition, in some embodiments, a PCM comprises a polymeric material. Any polymeric material not inconsistent with the objectives of the present disclosure may be used. Non-limiting examples of suitable polymeric materials for use in some embodiments described herein include thermoplastic polymers (e.g., poly(vinyl ethyl ether), poly(vinyl n-butyl ether) and polychloroprene), polyethylene glycols (e.g., CARBOWAX® polyethylene glycol 400, CARBOWAX® polyethylene glycol 600, CARBOWAX® polyethylene glycol 1000, CARBOWAX® polyethylene glycol 1500, CARBOWAX® polyethylene glycol 4600, CARBOWAX® polyethylene glycol 8000, and CARBOWAX® polyethylene glycol 14,000), and polyolefins (e.g., lightly crosslinked polyethylene and/or high density polyethylene).

Additional non-limiting examples of phase change materials suitable for use in some embodiments described herein include BioPCM materials commercially available from Phase Change Energy Solutions (Asheboro, North Carolina), such as BioPCM-(-8), BioPCM-(-6), BioPCM-(-4), BioPCM-(-2), BioPCM-4, BioPCM-6, BioPCM 08, BioPCM-Q12, BioPCM-Q15, BioPCM-Q18, BioPCM-Q20, BioPCM-Q21, BioPCM-Q23, BioPCM-Q25, BioPCM-Q27, BioPCM-Q30, BioPCM-Q32, BioPCM-Q35, BioPCM-Q37, BioPCM-Q42, BioPCM-Q49, BioPCM-55, BioPCM-60, BioPCM-62, BioPCM-65, BioPCM-69, and others.

It is further to be understood that a thermal energy storage system described herein can comprise a plurality of differing PCMs, including differing PCMs of differing types. Any mixture or combination of differing PCMs not inconsistent with the objectives of the present disclosure may be used. In some embodiments, for example, a thermal energy storage system comprises one or more fatty acids and one or more fatty alcohols. Further, as described above, a plurality of differing PCMs, in some cases, is selected based on a desired phase transition temperature and/or latent heat of the mixture of PCMs.

Further, in some embodiments, one or more properties of a PCM described herein can be modified by the inclusion of one or more additives. Such an additive described herein can be mixed with a PCM and/or disposed in a thermal energy storage system described herein. In some embodiments, an additive comprises a thermal conductivity modulator. A thermal conductivity modulator, in some embodiments, increases the thermal conductivity of the PCM. In some embodiments, a thermal conductivity modulator comprises carbon, including graphitic carbon. In some embodiments, a thermal conductivity modulator comprises carbon black and/or carbon nanoparticles. Carbon nanoparticles, in some embodiments, comprise carbon nanotubes and/or fullerenes. In some embodiments, a thermal conductivity modulator comprises a graphitic matrix structure. In other embodiments, a thermal conductivity modulator comprises an ionic liquid. In some embodiments, a thermal conductivity modulator comprises a metal, including a pure metal or a combination, mixture, or alloy of metals. Any metal not inconsistent with the objectives of the present disclosure may be used. In some embodiments, a metal comprises a transition metal, such as silver or copper. In some embodiments, a metal comprises an element from Group 13 or Group 14 of the periodic table. In some embodiments, a metal comprises aluminum. In some embodiments, a thermal conductivity modulator comprises a metallic filler dispersed within a matrix formed by the PCM. In some embodiments, a thermal conductivity modulator comprises a metal matrix structure or cage-like structure, a metal tube, a metal plate, and/or metal shavings. Further, in some embodiments, a thermal conductivity modulator comprises a metal oxide. Any metal oxide not inconsistent with the objectives of the present disclosure may be used. In some embodiments, a metal oxide comprises a transition metal oxide. In some embodiments, a metal oxide comprises alumina.

In other embodiments, an additive comprises a nucleating agent. A nucleating agent, in some embodiments, can help avoid subcooling, particularly for PCMs comprising finely distributed phases, such as fatty alcohols, paraffinic alcohols, amines, and paraffins. Any nucleating agent not inconsistent with the objectives of the present disclosure may be used.

Further, it is possible, in some embodiments, to obtain "staged" heating or cooling effects or multifunctional heat transfer by using a series of separate thermal energy storage systems described herein. For example, in some implementations, a thermal energy management system is described herein, the system comprising a first thermal energy storage system and a second thermal energy storage system, where both the first and second thermal energy storage systems comprise a thermal energy storage system described hereinabove. In some cases, the first energy storage system comprises a first container, a first heat exchanger disposed within the first container, and a first PCM disposed within the first container. The first heat exchanger comprises a first inlet pipe, a first outlet pipe, and a number n of first plates in fluid communication with the first inlet pipe and the first outlet pipe such that a fluid flowing from (or into) the first inlet pipe and to (or out of) the first outlet pipe flows through the first plates (or at least a portion or some of the first plates) in between the first inlet pipe and the first outlet pipe (or after flowing into the first inlet pipe but before flowing out of the first outlet pipe). Additionally, the first PCM is in thermal contact with the first plates. Similarly, the second thermal energy storage system can comprise a second container, a second heat exchanger disposed within the second container; and a second PCM disposed within the second container. The second heat exchanger comprises a second inlet pipe, a second outlet pipe, and a number m of second plates in fluid communication with the second inlet pipe and the second outlet pipe such that a fluid flowing from (or into) the second inlet pipe and to (or out of) the second outlet pipe flows through the second plates (or at least a portion or some of the second plates) in between the second inlet pipe and the second outlet pipe (or after flowing into the second inlet pipe but before flowing out of the second outlet pipe). The second PCM is in thermal contact with the second plates. Additionally, the number n and the number m are each at least 2. Further, the first outlet pipe of the first energy storage system is connected to the second inlet pipe of the second energy storage system.

It is to be understood that such a series of thermal energy storage systems is not limited to only two systems connected in series. Any desired number of individual thermal energy storage systems described herein could be used or connected with one another. Moreover, in some preferred embodiments in which multiple individual thermal energy storage systems described herein are connected with one another, the outlet of the nth system is connected to the inlet of the (n+1)th system using a straight pipe or connector, as opposed to a pipe or connector including an angle, bend, or elbow. Avoiding such turns or bends can help avoid undesired pressure differentials or pressure drops between individual systems.

Figure 5:
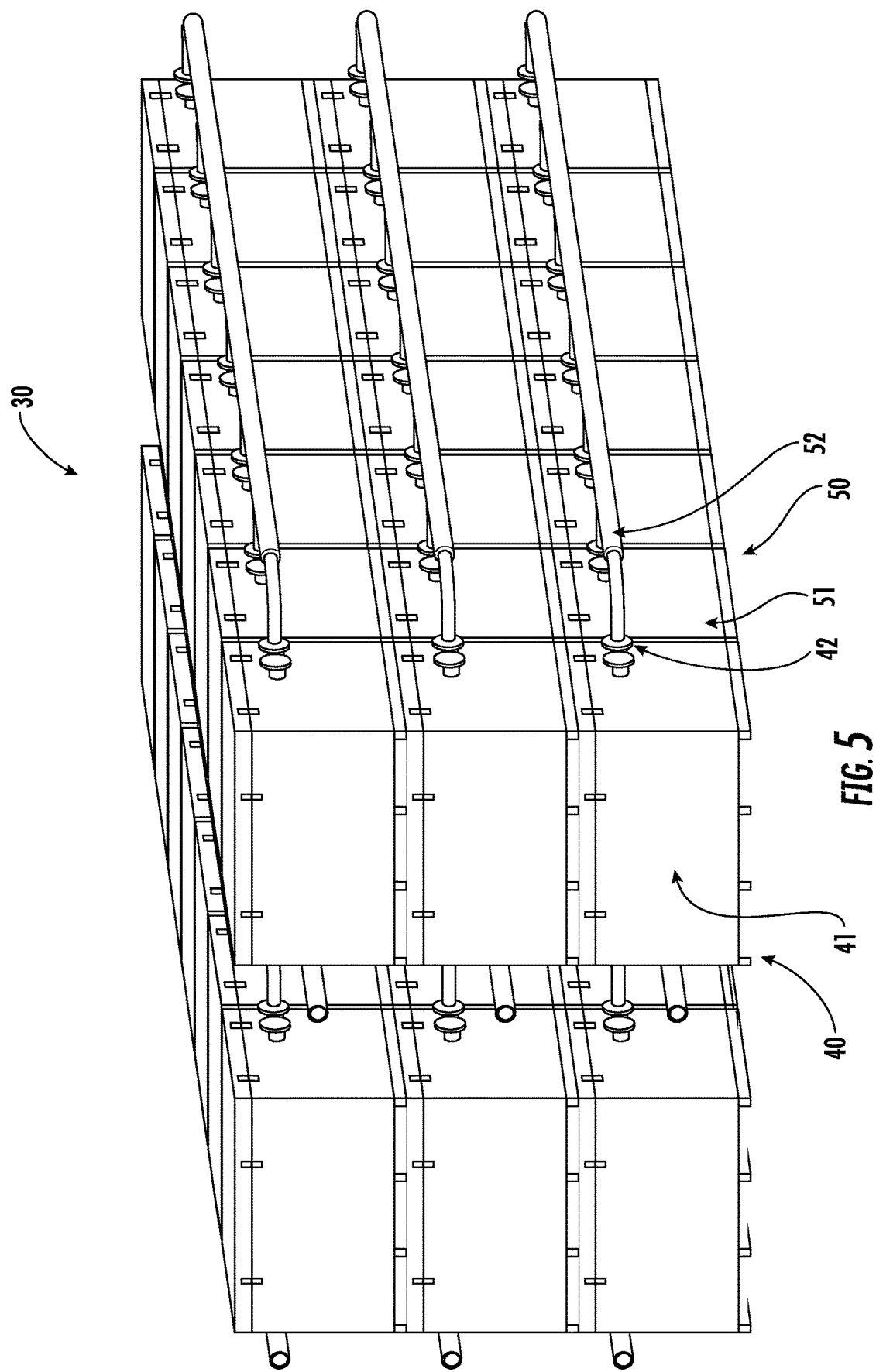
FIG. 5 illustrates a perspective view of a thermal energy management system according to one embodiment described herein having multiple thermal energy storage systems.

Briefly, with reference to the drawings, FIG. 5 illustrates a perspective view of one non-limiting, exemplary embodiment of a thermal energy management system described herein. In the embodiment illustrated in FIG. 5, the thermal energy management system comprises a first thermal energy storage system and a second thermal energy storage system as described above. This embodiment also comprises additional thermal energy storage systems in combination with the first thermal energy storage system and second thermal energy storage system to form an array or grouping of such thermal energy storage systems to form part or all of the thermal energy management system. The thermal energy management system shown here may further comprise other features which are internal to the thermal energy storage systems and which may not be depicted in FIG. 5 explicitly, but may be understood to be present an internal to the systems shown in FIG. 5.

In the embodiment shown in FIG. 5, the first thermal energy storage system comprises a first container, a first heat exchanger disposed within the first container, and a phase change material disposed within the first container. The first heat exchanger comprises a first inlet pipe, a first outlet pipe, and a number n of first plates, where n is at least 2, in fluid communication with the first inlet pipe and the first outlet pipe such that a fluid flowing from the first inlet pipe and to the first outlet pipe flows through the first plates in between the first inlet pipe and the first outlet pipe. The first phase change material is in thermal contact with the first plates. The plates have an inflated channel.

In the embodiment shown in FIG. 5, the second thermal energy storage system comprises a second container, a second heat exchanger disposed within the second container, and a second phase change material disposed within the second container. The second heat exchanger comprises a second inlet pipe, a second outlet pipe, and a number m of second plates, where m is at least 2, in fluid communication with the second inlet pipe and the second outlet pipe such that a fluid flowing from the second inlet pipe to the second outlet pipe flows through the second plates in between the second inlet pipe and the second outlet pipe. The second phase change material is in thermal contact with the second plates, and the plates have an inflated channel. The first outlet pipe of the first energy storage system is connected to the second inlet pipe of the second energy storage system.

Certain additional features, alternative configurations, and/or implementations are provided herein below.

The header pipe, in some cases, can be adapted to quickly isolate a single damaged plate or multiple damaged plates. For example, in some instances, such isolation can be accomplished by removing the connectors, hoses, or conduits (such as two flex hoses or flex tubes) between the relevant plate (or plates) and the header pipe or header pipe connector. Next, a plug or cap can be placed on the header pipe or header pipe connector. Such a design and method can help the system operate successfully (i.e., perform heat exchange), without taking the entire system out of service for maintenance.

In some embodiments, the inlet pipe, outlet pipe, and/or header pipe of a system described herein comprises quick change main line connectors. Such connectors can allow a pipe to be used with or coupled to flanged, threaded, or cam-lock connectors.

In some cases, a thermal energy storage system described herein comprises heat exchanger plate spacers. Such spacers can provide lateral spacing between multiple plates and/or can provide a framework or scaffolding for holding, retaining, or inserting multiple plates within the container or heat exchanger of the system. Moreover, in some instances, the heat exchanger plate spacers are adapted to be easily removed, such that the heat exchange plates can be easily accessed. Moreover, in some embodiments, such a system can facilitate the changing of a single heating exchanger plate in place (or in situ) without disconnecting the system from a chiller or other external component and/or without removing the entire heating exchanger apparatus or module from the container or system.

In some embodiments of thermal energy storage systems described herein, the header pipe of the system can be easily removed without any cutting or drilling.

In some cases, one or more plates of a heat exchanger described herein have channels for heat exchange fluid flow, wherein the channels are formed by "inflating" them with blown gas such as air. Further, in some instances, a heat exchanger plate described herein has a double inflate channel designed for lower pressure drop at higher flows while maintaining even thermal energy distribution across the plate. In other embodiments, a heat exchanger plate optionally has one flat side (OFS) and an inflated channel on the other side, while maintaining even thermal energy distribution across the plate. In some cases, the double or single inflate heat exchanger plate design can be used for applications in which Freon refrigerant is used as the heat exchange fluid or cooling medium.

In some cases, a heat exchanger described herein facilitates construction of a wide range of modular thermal energy storage system sizes (e.g., in terms of container volume and/or thermal mass and/or BTUs), without changing the heat exchanger plate dimensions and features. Instead, the only change can be the number of plates (e.g., at a spacing of 1.25 inches).

In some embodiments, the inlet pipe and outlet pipe can be formed from 0.5 inch tubing or pipe, which can be with or without a threaded male/female connection.

In some cases, a modular thermal energy storage system described herein has an airtight seal (e.g., between the container and the cover) to prevent any evaporation or degradation of the phase change material.

In some embodiments, the cover or lid of a container or system described herein has a 2-piece design or structure. Such a lid may also have a built-in rain channel. Such a channel can facilitating the placement of a thermal energy storage system outside, directly exposed to weather conditions. The lid, with or without the rain channel, can be watertight and weatherproof.

In some cases, the modular thermal energy storage system, including the container and the heat exchanger, is made or formed from or primarily made or formed from aluminum. Such a construction may be especially desirable for applications in which weight is a concern. Such applications may include but are not limited to use in which placement of the system in freight elevators or interior rooms or on decks or roof tops occurs.

In some embodiments, modular thermal energy storage systems described herein include or have a built in ground screw for grounding. Such a screw can be especially desirable when static electricity is a concern.

In some cases, heat exchangers described herein are adapted or configured for quick recharge and discharge of the phase change material (in terms of phase transitions and storage or release of latent heat).

Applications of thermal energy storage systems described herein may include but are not necessarily limited to heat recovery applications, solar thermal, boilers, chillers and other heating or air conditioning applications that have short cycling due to being oversized.

In some cases, a thermal energy storage system described herein is formed entirely or substantially entirely (e.g., at least 95% by weight or at least 99% by weight) from recyclable material (such as aluminum, steel, galvanized iron, and rubber).

II. METHODS OF STORING AND RELEASING THERMAL ENERGY

In another aspect, methods of storing and releasing or otherwise managing thermal energy are described herein. In some implementations, such a method comprises attaching a thermal energy storage system described herein (or a thermal energy management system described herein) to an external source of an external fluid. The thermal energy storage system (or thermal energy management system) can be any thermal energy storage system (or thermal energy management system) described hereinabove in Section I.

Moreover, as described further herein, the external fluid can be any external fluid not inconsistent with the objectives of the present disclosure. In some implementations, for instance, the fluid comprises a thermal fluid. For reference purposes herein, a thermal fluid can be a fluid having a high heat capacity. In some cases, a thermal fluid also exhibits high thermal conductivity. Moreover, the external fluid can be a liquid or a gas. A liquid fluid, in some embodiments, comprises a glycol, such as ethylene glycol, propylene glycol, and/or polyalkylene glycol. In some instances, a liquid fluid comprises liquid water or consists essentially of liquid water. A gaseous fluid, in some embodiments, comprises steam.

In addition, as described further herein, the external source of the external fluid can be any external source not inconsistent with the objectives of the present disclosure. In some preferred implementations, the external source of the external fluid is a source of heating or cooling, or a source of waste heat. In some cases, for instance, the external source of the external fluid comprises an HVAC chiller.

Methods described herein, in some embodiments, further comprise forcing a first portion of the external fluid through the heat exchanger of the thermal energy system. That is, the external fluid enters the heat exchanger through a proximal end and exits the heat exchanger through a distal end, having passed through the plates of the heat exchanger. Moreover, the first portion of the external fluid can enter the heat exchanger at a first or initial temperature (T1) and exit the heat exchanger at a second temperature (T2). Additionally, in some preferred embodiments, T1 and T2 are different. In some cases, T1 is higher than T2. Alternatively, in other instances, T1 is lower than T2.

It is further to be understood that, during the course of a method described herein, in some implementations, the first portion of the external fluid participates in thermal energy transfer or heat exchange with the PCM disposed in the container. For example, in some cases, the first portion of the external fluid transfers thermal energy or heat to the PCM, thereby lowering the temperature of the first portion of the external fluid. Additionally, in some such instances, the PCM stores at least a portion of the transferred thermal energy as latent heat (e.g., by undergoing a phase transition, such as a transition from a solid state to a liquid state).

Moreover, in some implementations, a method described herein further comprises forcing a second portion of the external fluid through the heat exchanger of the thermal energy system (e.g., at a later time), and transferring at least a portion of the stored latent heat from the PCM to the second portion of the external fluid, thereby increasing the temperature of the second portion of the external fluid.

In this manner, a thermal energy storage system described herein can store thermal energy during a first time interval and release it during a second time interval. For example, the system can store thermal energy when the PCM of the system is exposed to a relatively warm external fluid, where the relative warmth of the external fluid is based on the external fluid having a temperature that is greater than the relevant phase transition temperature of the PCM and greater than the temperature of the PCM. The system can release the stored thermal energy when the PCM of the system is later exposed to a relatively cool external fluid. Again, the relative coolness of the external fluid is based on the external fluid having a temperature that is lower than the temperature of the PCM at the time of thermal contact. Such a pattern of storing and releasing of thermal energy can be especially useful when it is desired to cool the external fluid during the first time interval. For instance, in some cases, the first fluid can be warm water associated with a chiller of an HVAC system or a fluid carrying "waste heat," such as waste heat generated by or within a nuclear reactor cooling pool, or waste heat generated by steam released by an industrial process. It is to be understood that such cooling provided by a thermal energy storage system described herein can be considered to be "passive" cooling that does not require the input of energy from another source, such as a separate HVAC system or other cooling system. The thermal energy transferred to the PCM during such a passive cooling step can be considered to "discharge" or reduce the total thermal capacity of the mass of PCM disposed in the system. The thermal capacity of the PCM can be restored or "recharged" during the second time interval, when the heat transfer between the PCM and the external fluid proceeds in the opposite direction, as compared to when the initial cooling of the external fluid occurred. This "recharging" can be carried out, in some instances, when energy (e.g., obtained from the power grid and used to power a conventional HVAC system associated with the external fluid) is more abundant and/or less expensive, such as during "off peak" hours.

It is also possible for the storing-and-releasing cycle described above to be carried out in the opposite sequence—releasing of thermal energy (i.e., heating of the external fluid) followed by storing of thermal energy (i.e., cooling of the external fluid). Such a heat exchange cycle may be desirable when the thermal energy storage system is used to provide passive or "peak" heating, rather than cooling.

For example, in some implementations of a method described herein, the PCM transfers thermal energy or heat to the first portion of the external fluid, thereby increasing the temperature of the first portion of the external fluid. In such an instance, the PCM can transfer the thermal energy by discharging latent heat (e.g., by undergoing a phase transition, such as a transition from a liquid state to a solid state). Additionally, in some cases, the method further comprises forcing a second portion of the external fluid through the heat exchanger of the thermal energy system (e.g., at a later time period), and transferring thermal energy from the second portion of the external fluid to the PCM, thereby decreasing the temperature of the second portion of the external fluid.

III. EMBODIMENTS

Certain implementations of apparatus and methods consistent with the present disclosure are provided as follows.

In a first implementation, a thermal energy system comprises a container; a heat exchanger disposed within the container; and a phase change material disposed within the container, wherein the heat exchanger comprises an inlet pipe; an outlet pipe; and a number of n plates in fluid communication with the inlet pipe and the outlet pipe such that a fluid flowing from the inlet pipe and to the outlet pipe flows through the plates in between the inlet pipe and the outlet pipe; wherein the phase change material is in thermal contact with the plates; wherein the number n is at least 2; and wherein one or more of the n plates has an inflated channel. Implementation 2: the system of implementation 1, wherein the container comprises exterior walls, interior walls, and a thermally insulating material disposed in between the exterior walls and the interior walls. Implementation 3: the system of implementation 2, wherein the exterior walls and/or the interior walls are formed from a metal. Implementation 4: the system of any of the preceding implementations, wherein the container is not a standard shipping container. Implementation 5: the system of any of the preceding implementations, wherein a header pipe is disposed in between and in fluid communication with the inlet pipe and the outlet pipe. Implementation 6: the system of implementation 5, wherein the header pipe is connected to each of the n plates independently. Implementation 7: the system of implementation 6, wherein the header pipe is connected to each of the n plates via one or more flexible conduits or hoses. Implementation 8: the system of any of implementations 5-7, wherein the header pipe is removable from the heat exchanger without cutting or drilling.

Implementation 9: the system of any of the preceding implementations, wherein one or more of the n plates has a double inflated channel. Implementation 10: the system of any of the preceding implementations, wherein one or more of the n plates has one flat side and one inflated channel side opposite the flat side. Implementation 11: the system of any of the preceding implementations, wherein the n plates are separated from one another by an average distance of 0.75 to 1.5 inches. Implementation 12: the system of any of the preceding implementations, wherein the inlet pipe and/or the outlet pipe is threaded. Implementation 13: the system of any of the preceding implementations wherein the inlet pipe and/or the outlet pipe is non-threaded.

Implementation 14: the system of any of the preceding implementations, wherein the system further comprises a cover. Implementation 15: the system of implementation 14, wherein the cover forms an airtight seal with the container. Implementation 16: the system of implementation 14 or 15, wherein the cover is formed from two pieces, each covering a portion of the container. Implementation 17: the system of implementation 16, wherein the two pieces each cover approximately half of the container. Implementation 18: the system of any of implementations 14-17, wherein the cover comprises a rain channel. Implementation 19: the system of any of the preceding implementations, wherein the container and/or heat exchanger is formed from or primarily formed from aluminum. Implementation 20: the system of any of the preceding implementations, wherein the system comprises one or more grounding screws.

Implementation 21: the system of any of the preceding implementations, wherein the plates have two heat transfer surfaces in facing opposition to one another, the two heat transfer surfaces being joined to one another to form four edges. Implementation 22: the system of implementation 21, wherein the two heat transfer surfaces define one or more interior fluid flow channels. Implementation 23: the system of implementation 22, wherein the one or more channels are defined by one or more inflated regions. Implementation 24: the system of any of the preceding implementations, wherein the plates are substantially parallel to one another.

Implementation 25: the system of any of the preceding implementations, wherein the phase change material is in direct physical contact with heat exchange surfaces of the plates. Implementation 26: the system of any of the preceding implementations, wherein the heat exchanger is at least partially embedded in the phase change material. Implementation 27: the system of any of the preceding implementations, wherein the phase change material has a phase transition temperature within one of the following ranges:

450-550° C.;
300-550° C.;
70-100° C.;
60-80° C.;
40-50° C.;
16-23° C.;
16-18° C.;
15-20° C.;
6-8° C.; and
−40 to −10° C.

Implementation 28: a thermal energy management system, the system comprising: a first thermal energy storage system comprising a first container; a first heat exchanger disposed within the first container; and a first phase change material disposed within the first container, wherein the first heat exchanger comprises a first inlet pipe; a first outlet pipe; and a number n of first plates in fluid communication with the first inlet pipe and the first outlet pipe such that a fluid flowing from the first inlet pipe and to the first outlet pipe flows through the first plates in between the first inlet pipe and the first outlet pipe; wherein the first phase change material is in thermal contact with the first plates; wherein the number n is at least 2; and wherein one or more of the n plates has an inflated channel. The thermal energy management system of implementation 28 further comprises a second thermal energy storage system comprising a second container; a second heat exchanger disposed within the second container; and a second phase change material disposed within the second container, wherein the second heat exchanger comprises a second inlet pipe; a second outlet pipe; and a number m of second plates in fluid communication with the second inlet pipe and the second outlet pipe such that fluid flowing from the second inlet pipe and to the second outlet pipe flows through the second plates in between the second inlet pipe and the second outlet pipe; wherein the second phase change material is in thermal contact with the second plates; wherein the number m is at least 2. Additionally, the first outlet pipe of the first energy storage system is connected to the second inlet pipe of the second energy storage system.

Implementation 29: a method of storing and releasing thermal energy, the method comprising attaching a thermal energy storage system to an external source of an external fluid, wherein the thermal energy storage system comprises the system of any of implementations 1-28. Implementation 30: the method of implementation 29, wherein the external fluid is liquid water. Implementation 31: the method of implementation 30, wherein the external source of the external fluid comprises an HVAC chiller or source of waste heat. Implementation 32: the method of any of implementations 29-31 further comprising: forcing a first portion of the external fluid through the heat exchanger of the thermal energy system. Implementation 33: the method of implementation 32, wherein: the first portion of the external fluid enters the heat exchanger at a first temperature (T1) and exits the heat exchanger at a second temperature (T2); and T1 and T2 are different. Implementation 34: the method of implementation 33, wherein T1 is higher than T2. Implementation 35: the method of implementation 33, wherein T1 is lower than T2.

Implementation 36: the method of any of implementations 32-35, wherein the first portion of the external fluid participates in thermal energy exchange with the phase change material disposed in the container. Implementation 37: the method of implementation 36, wherein the first portion of the external fluid transfers thermal energy to the phase change material, thereby lowering the temperature of the first portion of the external fluid. Implementation 38: the method of implementation 37, wherein the phase change material stores at least a portion of the transferred thermal energy as latent heat. Implementation 39: the method of implementation 38 further comprising: forcing a second portion of the external fluid through the heat exchanger of the thermal energy system; and transferring at least a portion of the stored latent heat from the phase change material to the second portion of the external fluid, thereby increasing the temperature of the second portion of the external fluid. Implementation 40: the method of implementation 36, wherein: the phase change material transfers thermal energy to the first portion of the external fluid, thereby increasing the temperature of the first portion of the external fluid; and the phase change material transfers the thermal energy by discharging latent heat. Implementation 41: the method of implementation 40 further comprising: forcing a second portion of the external fluid through the heat exchanger of the thermal energy system; and transferring thermal energy from the second portion of the external fluid to the phase change material, thereby decreasing the temperature of the second portion of the external fluid.

Various implementations of apparatus and methods have been described in fulfillment of the various objectives of the present disclosure. It should be recognized that these implementations are merely illustrative of the principles of the present disclosure. Numerous modifications and adaptations thereof will be readily apparent to those skilled in the art without departing from the spirit and scope of the present disclosure. For example, individual steps of methods described herein can be carried out in any manner and/or in any order not inconsistent with the objectives of the present disclosure, and various configurations or adaptations of apparatus described herein may be used.

The invention claimed is:

1. A thermal energy storage system comprising:
   (a) an insulated container defining an interior volume filled with a phase change material;
   (b) a heat exchanger disposed within the container, the heat exchanger comprising
      (i) an inlet header pipe;
      (ii) an outlet header pipe; and
      (iii) a plurality of plates immersed or embedded within, and in thermal contact with, the phase change material and arranged within the container substantially parallel to one another, each one of which is independently connected in fluid communication with the inlet header pipe by a respective flexible conduit or hose and is independently connected in fluid communication with the outlet header pipe by a respective flexible conduit or hose such that a specific portion of fluid flowing from the inlet header pipe, through a given plate of the plurality, and then into the outlet header pipe flows only through that given plate to the exclusion of all other plates of the plurality, the fluid flow through the plurality of the plates of the heat exchanger being arranged in parallel; and
      (iv) a framework maintaining the arrangement of the plurality of plates within the container;
   (c) wherein each of the plurality of plates comprises
      (i) a first inflated region defining a first plurality of parallel interior fluid flow channels from the inlet header pipe to the outlet header pipe, the fluid flow through the first plurality of the parallel channels of the first inflated region being arranged in parallel; and
      (ii) a second inflated region defining a second plurality of parallel interior fluid flow channels from the inlet header pipe to the outlet header pipe, the fluid flow through the second plurality of the parallel channels of the second inflated region being arranged in parallel; and
   (d) wherein each said flexible conduit or hose is configured for disconnect and removal from the plate and the header pipe to which it is connected, which header pipe is configured for capping at the disconnect, and the framework is configured for removal and insertion of the plate for in situ replacement of a damaged plate.

2. The thermal energy storage system of claim 1, wherein at least one of the plurality of plates has a double inflated channel.

3. The thermal energy storage system of claim 1, wherein at least one of the plurality of plates has a flat side and an opposite, inflated channel side.

4. The thermal energy storage system of claim 1, wherein the plates of the plurality are separated from one another by an average distance of between 0.75 and 1.5 inches.

5. The thermal energy storage system of claim 1, wherein the system further comprises a cover that forms an airtight seal with the container.

6. The thermal energy storage system of claim 5, wherein the cover is formed from two pieces, each covering approximately half of the container.

7. The thermal energy storage system of claim 6, wherein the cover comprises a rain channel.

8. The thermal energy storage system of claim 1, wherein each of the plurality of plates have two heat transfer surfaces in facing opposition to one another, the two heat transfer surfaces being joined to one another and defining therebetween the interior fluid flow channels.

9. The thermal energy storage system of claim 1, wherein the phase change material is in direct physical contact with the heat exchange surfaces of the immersed or embedded plates.

10. The thermal energy storage system of claim 1, wherein a plurality of plate spacers provides the framework for maintaining the arrangement of the plurality of plates within the container.

* * * * *